United States Patent [19]

Pernic

[11] 4,298,357
[45] Nov. 3, 1981

[54] DEGASSING SYSTEM

[75] Inventor: Stanley J. Pernic, Round Lake, Ill.

[73] Assignee: Baxter Travenol Laboratories, Inc., Deerfield, Ill.

[21] Appl. No.: 164,142

[22] Filed: Jun. 30, 1980

Related U.S. Application Data

[63] Continuation of Ser. No. 923,324, Jul. 10, 1978, abandoned.

[51] Int. Cl.³ .............................................. B01D 31/00
[52] U.S. Cl. ........................................ 55/165; 55/189; 210/137; 210/188; 210/258; 210/259; 210/295; 210/321.3
[58] Field of Search .................. 55/38, 40, 43, 48, 51, 55/52, 55, 89, 189, 165; 210/98, 136, 137, 167, 180, 188, 195.2, 197, 258, 259, 295, 418, 321, 646, 647, 741; 137/510; 251/DIG. 4

[56] References Cited

U.S. PATENT DOCUMENTS

| | | | |
|---|---|---|---|
| 3,778,969 | 12/1973 | Sudduth | 55/55 |
| 3,878,095 | 4/1975 | Frasier et al. | 210/87 |
| 4,137,160 | 1/1979 | Ebling et al. | 210/87 X |
| 4,153,554 | 5/1979 | von der Heide et al. | 210/321.1 X |

*Primary Examiner*—Charles N. Hart
*Assistant Examiner*—David R. Sadowski

*Attorney, Agent, or Firm*—Paul C. Flattery; Gerald S. Geren

[57] ABSTRACT

A supplementary degassing system is disclosed herein for use with a bedside console of the type employed in a central delivery system in the event additional degassing is necessary. The system may also be incorporated in a dialysis machine as the main degassing system.

The system includes a chamber for receiving a liquid to be degassed. The chamber includes: a liquid inlet; a gas outlet through which gas is withdrawn; a degassed liquid outlet from which degassed liquid is drawn; and a recirculation inlet for receiving at least recirculated liquid. A recirculation loop is also provided for recirculating and treating liquid from the chamber. The loop includes a variable-restriction assembly for regulating pressures and enhancing degassing. The variable-restriction assembly includes a variable restriction comprising an orifice and valve for adjustably controlling liquid flow through the orifice. A pressure sensor is also provided for (1) sensing the pressure of the liquid flowing to the variable-restriction assembly and (2) controlling the flow through the variable restriction in relation to the pressure.

When used in combination with the bedside console, the gas outlet is connected to the bedside console's effluent pump and at least a portion of the liquid from the outlet of the chamber is directed to the liquid inlet for the console.

13 Claims, 3 Drawing Figures

DEGASSING SYSTEM

This is a continuation, of application Ser. No. 923,324, filed July 10, 1978 now abandoned.

BACKGROUND OF THE INVENTION

This invention relates to artificial kidney systems, and more particularly, to a degassing system for supplementary use with or for incorporation in dialysis machines.

In dialysis, a patient's blood and dialysis solution flow through a dialyzer which includes a semipermeable membrane for separating blood and dialysis solution. Impurities from the blood cross the membrane and enter the dialysis solution for disposal.

In some systems the dialysis solution is drawn through the dialyzer under a negative pressure (i.e., below atmospheric pressure) by a dialysis machine. The reduction of pressure on the dialysis solution to below atmospheric pressure allows dissolved gas to come out of solution and form bubbles. If such bubbles enter the dialyzer, they can undesirably impair the efficiency and operation of the dialyzer.

Degassing or deairing systems are known for removing air or other gases from dialysis solution prior to dialysis. Such systems are shown in U.S. Pat. Nos. 3,528,550; 3,598,727; 3,626,670; 3,878,045; and British Patent No. 1,501,956. As used herein, degassing refers to subjecting a liquid to very low negative pressures, such as $-600$ to $-700$ mm/Hg, so as to remove both entrained and dissolved gases from a liquid. Deairing refers to a milder treatment where the liquid may be subjected to pressure only as low as perhaps $-300$ mm/Hg and only visible gas bubbles are removed with little, if any, effect on removal of dissolved gases.

The foregoing patents disclose both (1) complete dialysis machines; and (2) central delivery systems in which the dialysis solution is prepared at a central location and then delivered to multiple remote stations or bedside consoles. In some central delivery systems the dialysis solution is degassed at the central station and the bedside console may include a deairing unit which will remove only visible bubbles. In other systems there is no provision for degassing at the central station, and therefore the liquid entering the console and dialyzer will only be deaired. In such systems it has been found to be desirable to degas liquid received from the central station prior to its delivery to the console.

It is therefore an object of this invention to provide a supplementary system for degassing liquid flowing to a bedside console.

This and other objects of the invention will become apparent from the following description and appended claims.

SUMMARY OF THE INVENTION

There is disclosed herein a supplementary degassing system for cooperation with a bedside console to degas liquid which is to be delivered by the bedside console to the dialyzer.

This system is connected to the bedside console and includes a degassing tank and a liquid recirculation loop. In the recirculation loop there is provided a variable-restriction assembly for regulating pressure and for degassing the liquid which is being recirculated. The size of the restriction is varied in relation to the pressure or flow of liquid from the degassing tank to the assembly which, in turn, is related to flow to the bedside console.

Furthermore, this degassing system is suitable for use independently of the bedside console and may be used as the primary degassing system in other types of dialysis machines.

DESCRIPTION OF THE PREFERRED EMBODIMENT

Figure 1:
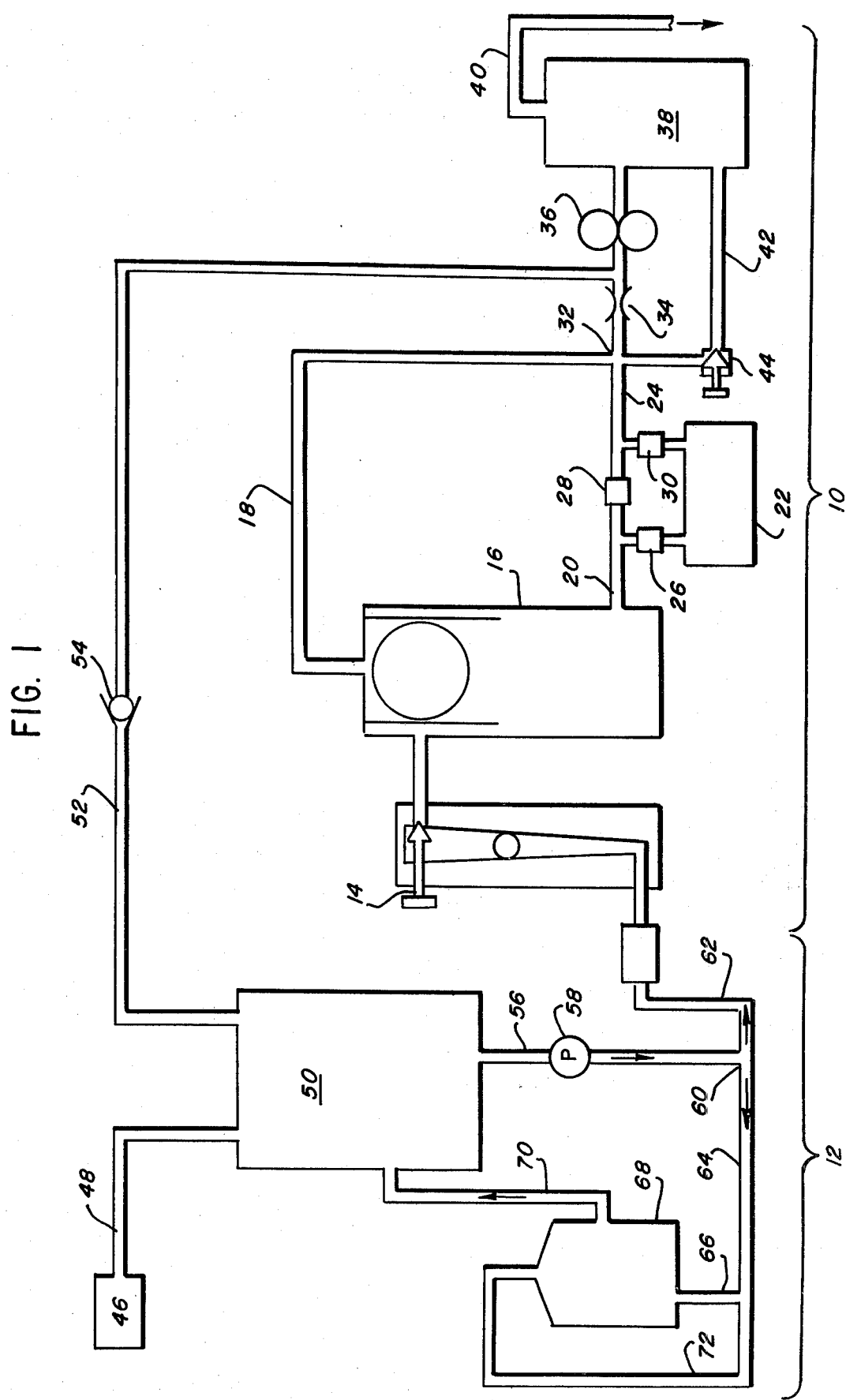
FIG. 1 is a flow diagram showing the supplementary degassing system and the bedside console.

Referring now to FIG. 1, there is shown the bedside console 10 generally and a supplementary degassing system 12 generally.

The Bedside Console

Referring first to the bedside console, dialysis solution is delivered to the flow control valve 14. From the valve 14 liquid flows to a deairing tank 16. Gas is drawn from the tank 16 via a gas line 18 and dialysis solution is drawn from the tank via line 20. The dialysis solution is drawn through line 20 to the dialyzer 22 and then to line 24. Three valves 26, 28 and 30 are provided to control flow to and from the dialyzer and to permit flow to bypass the dialyzer.

The gas line 18 and the dialysis solution flow line 24 connect at a junction 32 from which the dialysis solution and the gas are drawn through fixed restriction 34 by a constant-speed positive-displacement pump 36. The pump 36 draws the dialysis solution from the tank 16 via line 20—as well as the gas from the tank via line 18. From the pump 36 the spent-dialysis solution and gas flow under a positive pressure to a holding tank 38 and the dialysis solution and gas can exit the tank 38 via line 40 and flow to drain. Some dialysis solution is recirculated from the tank 38 via line 42 through a negative pressure control valve 44 and back to the junction 32.

The pump 36, tank 38 and valve 44 and the interconnecting lines provide a negative-pressure-control recirculation loop whereby some amount of used or spent-dialysis solution recirculates and the negative pressure applied by the pump 36 to the dialyzer 22 and through line 18 to the deairing tank 16 can be controlled by adjustment of the valve 44 which adjusts the amount of recirculating liquid.

Supplementary Degassing System

The supplementary degassing system 12 is positioned between the bedside console 10 and the dialysis solution supply or central delivery station 46. Thus dialysis solution from the supply 46 must flow through the supplementary degassing system before entering the bedside console 10 and dialyzer 22. Hence effective degassing is assured.

It should be appreciated that in appropriate circumstances the supplementary degassing system (1) can be used independently and separately of a bedside console and (2) may be used to treat water rather than dialysis solution.

Generally speaking, dialysis solution flows from the supply 46 via line 48 to the degassing tank or chamber 50. Gas is drawn from the tank 50 by the pump 36 in the bedside console via line 52, and a check valve 54 is provided between the tank 50 and pump 36 to prevent bacterial contamination and back-flow into the tank 50. In this embodiment, use of the pump 36 is desirable; however, use of other vacuum sources, such as an independent pump, may be desirable in other applications.

A recirculation loop is provided for drawing dialysis solution from the tank 50, passing it through a variable-restriction assembly 68 and then back to the tank. This loop provides pressure regulation and enhances the degassing. Dialysis solution in the tank 50 is drawn from the tank via line 56 by the recirculation pump 58 and flows under a positive pressure to the junction 60. There the flow is divided with some solution going to the bedside console and valve 14 via the delivery line 62. The remainder of the solution flows through the recirculation line 64. The recirculation line 64 delivers liquid via line 66 to the variable-restriction assembly 68 for treatment and delivery via line 70 to the tank 50. The line 70 connects tangentially with the tank 50 to cause bubbles adhering to surfaces within the tank 50 to release and be removed. Some liquid also flows via line 72 to a pressure sensing apparatus associated with the variable-restriction assembly 68 for controlling flow through the variable restriction and degassing thereat.

Figure 2:
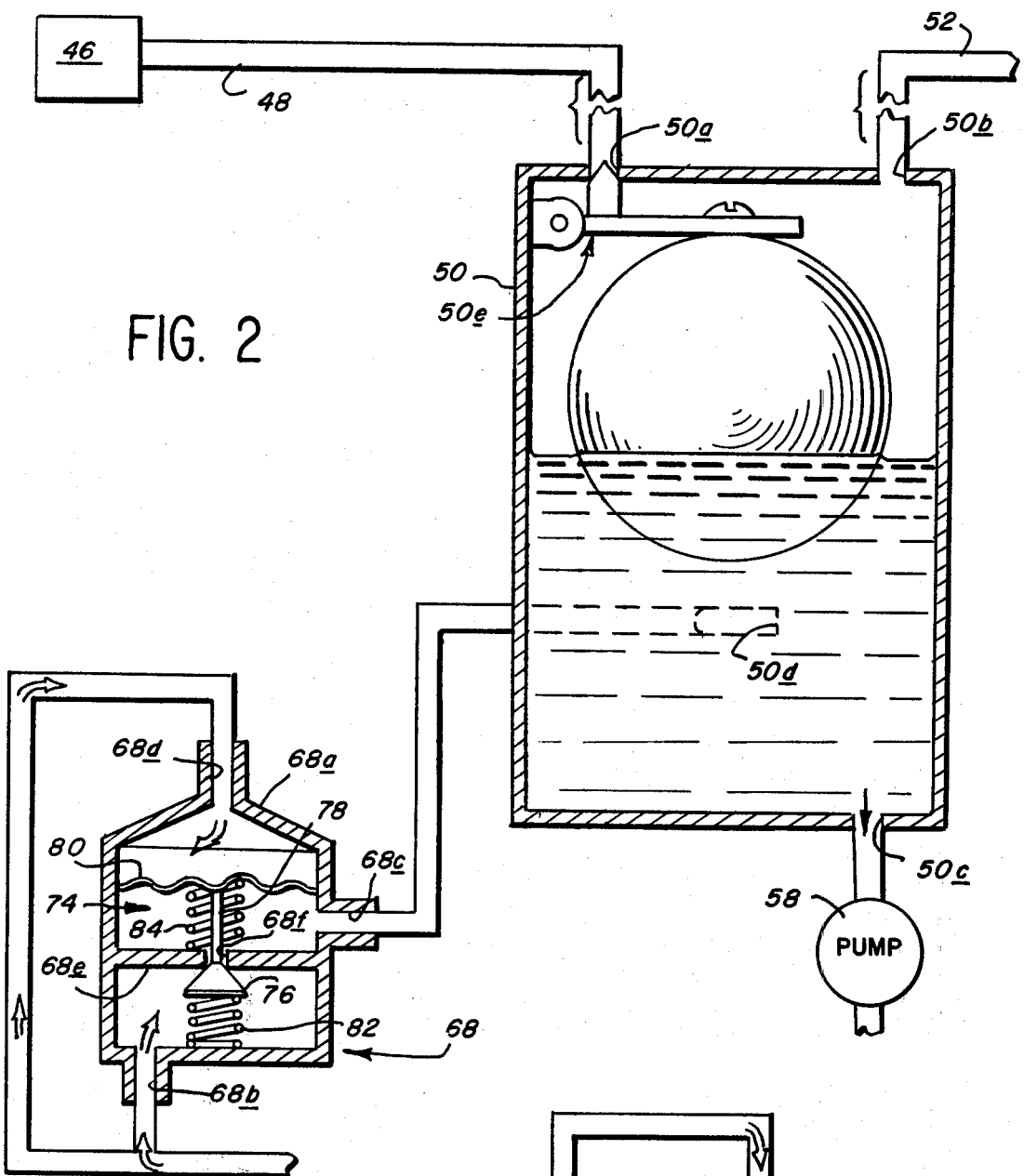
FIG. 2 is an enlarged detailed view showing the supplementary degassing system, and in particular, the degassing tank and variable-restriction assembly under a first set of flow conditions.

Referring now to FIG. 2, the tank 50 and the variable-restriction assembly 68 are shown in greater detail. The tank 50 includes a liquid inlet 50a through which solution from the supply enters the tank. A gas outlet 50b is provided for connection with the gas line 52. A liquid outlet 50c is provided for communication with recirculation pump 58. A recirculation inlet 50d is provided through which recirculating solution and separated gas are redelivered to the tank 50 from assembly 68. A float-controlled valve assembly 50e is provided for controlling the flow of solution from the supply into the tank in relation to the level of solution in the tank.

The variable-restriction assembly 68 includes a casing 68a having an inlet 68b, an outlet 68c, a pressure port 68d, and a wall 68e having an orifice 68f therein. A valve and pressure sensor assembly 74 generally is provided within the casing 68a. The valve and sensor assembly includes a conically shaped valve member 76, for cooperation with the orifice 68f in varying flow therethrough and the valve member 76 is connected via a stem 78 to a pressure sensing diaphragm 80. As can be seen, the valve member is positioned on the inlet side of the orifice, between the orifice and inlet, and the stem extends through the orifice to connect to the diaphragm. The valve member 76 and diaphragm 80 are biased toward a closed position or no-flow position by the coiled compressing springs 82 and 84 respectively.

Figure 3:
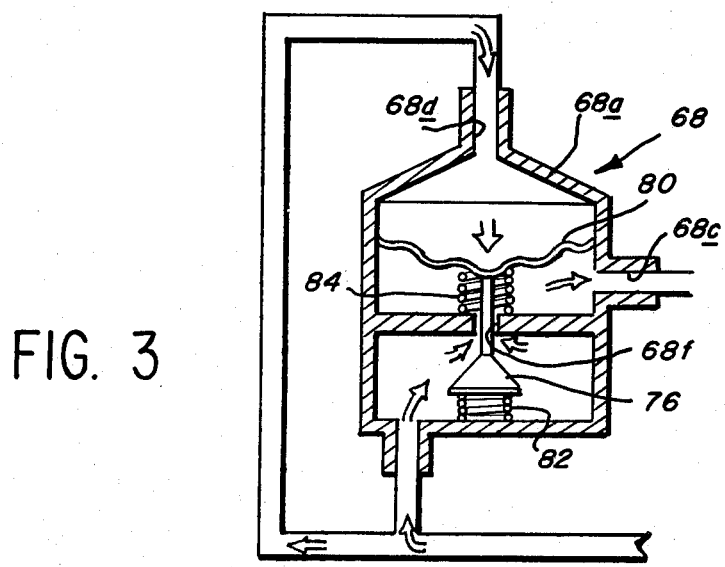
FIG. 3 is a detailed view showing the variable-restriction assembly under different flow conditions.

In the no-flow position, the valve member 76 seats against the orifice 68f, thereby prohibiting any flow to the tank 50. As pressure at port 68d increases, the diaphragm moves toward the orifice 68f, and the valve unseats from the orifice 68f to permit flow, as is seen in FIG. 3.

Operation

In operation, dialysis solution flows from the supply 46 via line 48 into tank 50. In tank 50, the liquid is exposed to negative pressures as low as $-650$ to $-700$ mm/Hg due to the action of the pump 36 acting through the line 52. The valve 50e closes the inlet 50a to the flow of incoming dialysis solution when the dialysis solution in the tank reaches a predetermined level and thereby defines a restricted volume against which pump 36 and pump 58 draw to remove gas from the dialysis solution.

Pump 58 draws the treated solution from the tank 50 and causes it to flow to the junction 60. Under normal operating conditions and with a normal demand for solution from the bedside console 10, approximately one-quarter of the flow reaching the junction 60 flows via line 62 to the console 10, and the remaining three-quarters of the solution recirculates back to the tank 50 via line 64, the assembly 68 and line 70.

Under such conditions there is also flow from the junction 60 via line 72 and to the pressure sensing port 68d of the variable-restriction assembly 68. Within the variable-restriction assembly, the pressure of the solution in line 72 acts on the diaphragm 80 to urge it toward the orifice or downwardly. It will be appreciated that the pressure on the diaphragm is inversely related to the flow to the bedside console 10. In other words, if the flow to the console is low, the pressure on the diaphragm is high, while if the flow to the console is high, the pressure is low.

Solution also flows through the recirculation line 64 through the inlet 68b into the variable-restriction assembly and through the orifice 68f, the size of which is controlled by the valve member 76. If the size of the variable restriction is small, then the solution being drawn through will be under a high negative pressure which causes gas to separate from the liquid flowing therethrough. If the orifice 68f and valve 76 provide a large opening, the amount of degassing is reduced.

In other words, the amount of degassing effected at the orifice 68f and valve 76 is in direct relation to the size of the opening which both members provide. The solution and separated gas then leave the variable-restriction assembly 68 via the outlet 68c and flow back to the tank 50. There the separated gas bubbles are drawn to the top of the tank and are drawn from the tank via line 52. The strength of the springs 82 and 84 and the positioning of the valve member 76 can be controlled so as to achieve degassing under what is expected to be normal operation with three-quarters of solution recirculating in the supplementary degassing circuit.

The one-quarter of the solution entering the bedside console 10 via line 62 flows through a flow restricter valve 14 which controls the amount of solution entering the dialyzer. From the valve 14 the solution enters the deairing tank 16 in which gas is separated and is drawn via line 18 to the pump 36. The solution in the deairing tank 16 exits the tank and is drawn through the line 20, and during operation of the dialyzer through the valve 26, dialyzer 22, valve 30, and to the pump 36.

In the event an alarm condition exists where dialysis should not take place, the valves 26 and 30 are closed, and the valve 28 is opened, thereby permitting flow to bypass the dialyzer. The flow from the line 18 and line 24 passes through the fixed restriction 34 and to the dialysis solution pump and the holding tank 38. At tank 38 some solution and gas can exit and flow to drain via line 40. The tank also includes a recirculation loop, and by adjustment of the valve 44, negative pressure within the dialyzer 22 can be controlled.

The fixed restriction 34 cooperates with the pump 36 to assure application of the greatest negative pressure by the pump 36 to the tank 50. Conversely, the restriction limits the negative pressure which can be applied by the pump 36 to the dialyzer 22 and deairing tank 16.

In the event flow to the bedside console 10 changes, the assembly 68 accommodates those changes. Thus if the flow to the console is low, the valve is opened to permit a large amount of recirculation with low degassing. If the flow to the console is high, then recirculation is low and degassing is high.

It will be appreciated that numerous modifications and changes can be made to the embodiment disclosed herein without departing from the spirit and scope of this invention.

What is claimed is:

1. A degassing system for use in an artificial kidney system for removing dissolved and entrained gases from a liquid prior to delivery of said liquid to a dialyzer, said degassing system including:
    chamber means for receiving the liquid to be degassed and constructed to degas said liquid at negative pressures as low as about −650 mm/Hg, said chamber means including a liquid inlet for receiving liquid to be degassed; a gas outlet through which gas is withdrawn; and a liquid outlet from which degassed liquid is drawn for delivery to a dialyzer;
    valve means associated with said liquid inlet means for controlling liquid flow into said chamber means and the liquid level within said chamber means so as to define a restricted volume for gas within said chamber means; and
    pump means associated with said liquid outlet for drawing said liquid from said liquid outlet;
    wherein the improvement comprises:
    (a) said chamber means further including means defining an inlet for receiving recirculating liquid; and
    (b) there being further provided a recirculation loop associated with said chamber means whereby at least a portion of the liquid drawn from the chamber through said liquid outlet is recirculated to the chamber through said recirculation inlet means, said loop including variable-restriction assembly means through which said recirculating liquid flows, said assembly means including:
        (i) variable restriction means positioned downstream of said pump means for cooperation in enhancing degassing by separating gas from liquid flowing through said assembly; and
        (ii) sensing means for sensing the pressure of the liquid flowing to said assembly and for varying said restriction means in relation to said pressure sensed by said sensing means.

2. A degassing system as in claim 1, wherein said variable restriction means cooperates in regulating the pressure of liquid downstream of said pump means.

3. A degassing system as in claim 2, wherein said variable-restriction assembly includes means defining an orifice through which all liquid flowing through said assembly must flow and valve means cooperatively associated with said orifice for adjustably controlling liquid flow through said orifice.

4. A degassing system as in claim 3, wherein said valve means is positioned on the upstream side of said orifice.

5. A degassing system as in claim 3, wherein there is further provided biasing means for cooperation with said valve means so as to bias said valve means toward said orifice and toward a closed position.

6. A degassing system as in claim 1, wherein said pressure sensing means includes a pressure sensing port for receiving liquid from said chamber means and diaphragm means associated with said port and cooperatively associated with said variable restriction means so that as said diaphragm moves in relation to changes in pressure said variable restriction is controllably adjusted.

7. A degassing system as in claim 6 wherein said variable restriction means includes: means defining an orifice through which liquid flowing through said assembly must flow; and valve means associated with said orifice, said valve means being cooperatively associated with said diaphragm so as to move in response and in relation to movements of said diaphragm.

8. A degassing system as in claim 7, wherein said valve means includes: (a) a seat section positioned on the upstream side of said orifice, and (b) means defining an elongated stem which passes through said orifice, and is connected to said diaphragm so that movement of said diaphragm moves the seat toward and away from said orifice.

9. A degassing system as in claim 8, wherein biasing means are provided and are cooperatively associated with each of said valve means and said diaphragm means so as to bias both said valve means and diaphragm means toward a closed or no-flow position.

10. A degassing system as in claim 1, wherein said pump means delivers degassed liquid to said variable-restriction assembly.

11. A degassing system as in claim 1, wherein said assembly includes (a) a flow-through housing having an inlet for receiving liquid from said chamber means; (b) an outlet for connection to said recirculating liquid inlet; and with (c) said variable restriction means being positioned between said inlet and said outlet.

12. A degassing system as in claim 1, and in combination therewith, a bedside console dialysis unit which includes: flow control valve means for receiving degassed liquid from said chamber means; deairing means for receiving liquid from said flow control valve means; pump means for drawing air from said deairing means and for drawing deaired dialysis solution from said deairing means through a dialyzer; degassing line means extending from said gas outlet means in said chamber means to said pump means; and fixed restriction means for limiting negative pressure within said bedside console dialysis unit and increasing the negative pressure to the degassing line means, said restriction means being positioned between (a) said degassing line means and the pump means and (b) the deairing means and a dialyzer.

13. A degassing system as in claim 12, wherein there is further provided check valve means in said gas line between said chamber means and said pump means for preventing back flow and contamination.

* * * * *